United States Patent
Al-Alem et al.

(10) Patent No.: US 10,853,180 B2
(45) Date of Patent: Dec. 1, 2020

(54) AUTOMATICALLY SETTING A DYNAMIC RESTORE POLICY IN A NATIVE CLOUD ENVIRONMENT

(71) Applicant: EMC IP Holding Company LLC, Hopkinton, MA (US)

(72) Inventors: Luay Al-Alem, Lynnfield, MA (US); Antony Bett, Shrewsbury, MA (US); Assaf Natanzon, Tel Aviv (IL); Michael Rhodes, Stamford, CT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 129 days.

(21) Appl. No.: 16/155,789

(22) Filed: Oct. 9, 2018

(65) Prior Publication Data

US 2020/0110667 A1    Apr. 9, 2020

(51) Int. Cl.
*G06F 11/00* (2006.01)
*G06F 11/14* (2006.01)

(52) U.S. Cl.
CPC .... *G06F 11/1438* (2013.01); *G06F 2201/805* (2013.01); *G06F 2201/82* (2013.01)

(58) Field of Classification Search
CPC .......... G06F 11/00; G06F 11/07; G06F 11/22; G09F 11/008; G09F 11/079; G09F 11/3409; G09F 11/3452; G09F 11/00; G09F 11/07; G09F 11/2023; G09F 11/1479

USPC ................................................ 714/2, 25, 19
See application file for complete search history.

(56) References Cited

U.S. PATENT DOCUMENTS

| | | | |
|---|---|---|---|
| 10,656,929 B2 * | 5/2020 | Jamjoom | G06F 11/3612 |
| 10,705,868 B2 * | 7/2020 | Bailey | G06F 8/60 |
| 2017/0046146 A1 | 2/2017 | Jamjoom | |
| 2017/0364434 A1 * | 12/2017 | Kairali | G06F 11/3668 |
| 2018/0034839 A1 * | 2/2018 | Ahuja | H04L 41/0668 |
| 2019/0238636 A1 | 8/2019 | Li | |
| 2019/0312900 A1 * | 10/2019 | Ahuja | H04L 63/20 |
| 2019/0340059 A1 * | 11/2019 | Bagarolo | G06F 11/0793 |
| 2019/0347168 A1 * | 11/2019 | Giannetti | G06F 9/4881 |

OTHER PUBLICATIONS

U.S. Appl. No. 16/172,358, filed Oct. 26, 2018, Michael Rhodes et al.
U.S. Appl. No. 16/172,358, dated Mar. 23, 2020, Office Action.

* cited by examiner

*Primary Examiner* — Sarai E Butler
(74) *Attorney, Agent, or Firm* — Workman Nydegger

(57) ABSTRACT

One example method includes receiving an indication that an application has experienced a problem, where the application comprises a plurality of microservices, discovering that one of the microservices is a partial cause of the problem, identifying one or more connections among the microservices, where one or more of the connections indicates a dependency, or lack of dependency, among two or more microservices, and restoring the microservice that is a partial cause of the problem, and also restoring any other microservices that are dependent on that microservice.

20 Claims, 5 Drawing Sheets

US 10,853,180 B2

AUTOMATICALLY SETTING A DYNAMIC RESTORE POLICY IN A NATIVE CLOUD ENVIRONMENT

FIELD OF THE INVENTION

Embodiments of the present invention generally relate to data security and availability. More particularly, at least some embodiments of the invention relate to systems, hardware, software, computer-readable media, and methods directed to processes for implementing restore processes in environments, such as cloud environments, where microservices may be employed.

BACKGROUND

The so-called "cloud native" application architecture is disrupting the way organizations build software because that architecture may generate enable significant productivity boosts both with respect to application development, and application deployment. Cloud native patterns and practices, originally crafted by the likes of Google and Netflix, have found their way into the industry via popular open source projects. Developers from small startups all the way to huge corporations are adopting those technologies and practices and weaving them into the software fabric of their business. While cloud native application development and deployment have provided important benefits, various problems nonetheless remain.

For example, because cloud native applications may be updated more frequently than monolithic applications, each update imposes the possibility of data corruption. As another example, microservices are often interdependent, such that a failure of one microservice during an update is likely to have a negative impact on other dependent microservice applications.

Moreover, insofar as typical restore processes work in a bulk, random manner, there is a lack of fine grained control over how the restores/order of applications and dependent microservices are restored. To illustrate, when a restore is needed, the administrator must first identify the failed microservice application, then choose a backup to restore from, and finally, perform the restore. All of these processes are typically performed manually. However, this conventional approach to the configuration and implementation of restore processes may not be well suited for cloud native environments where microservices may be dynamic and in constant state of change.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
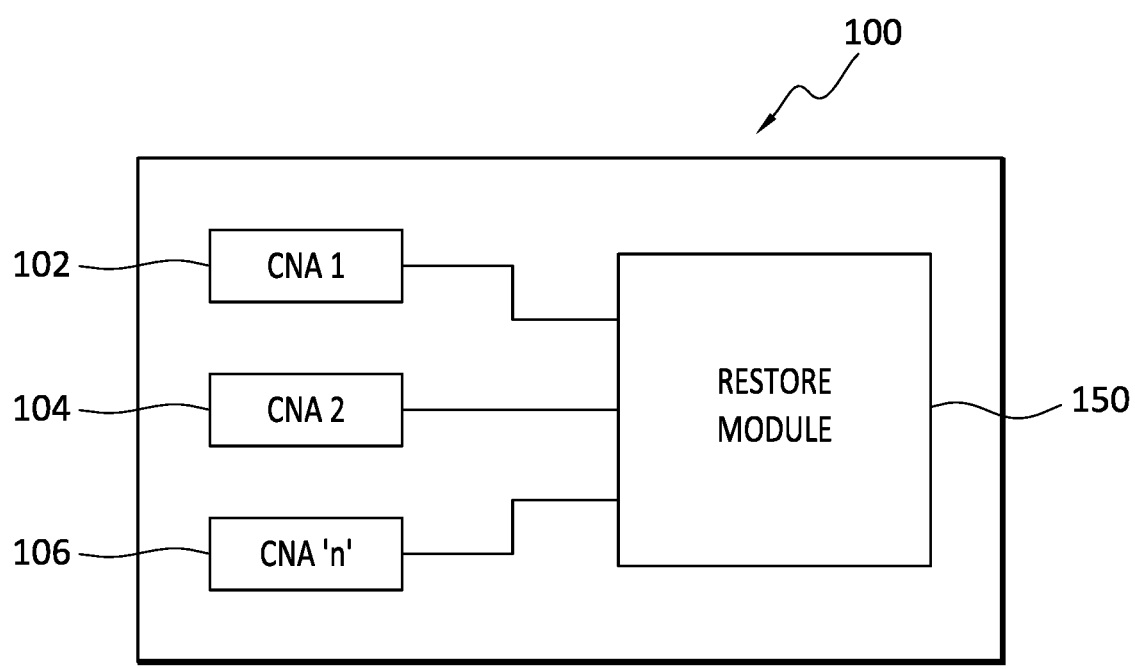
FIG. 1 discloses aspects of an example operating environment for some embodiments of the invention.

Embodiments of the present invention generally relate to data security and availability. More particularly, at least some embodiments of the invention relate to systems, hardware, software, computer-readable media, and methods directed to processes for implementing restore processes in environments, such as cloud environments, where microservices may be employed. Microservices may also be referred to herein simply as 'services.'

In more detail, cloud native applications may be developed using a microservices architecture. In a microservice architecture, an application comprises a suite of a small independently deployable modular services, sometimes referred to as microservices. Each microservice runs a unique process and may communicate with other microservices, depending on the requirements of the application. As well, because the microservice is not specific to any particular application, the functionality of that microservice can be employed by multiple different applications. Due to the number of different microservices, and what may be complicated relationships among them, a service mesh may be provided that takes the form of a dedicated infrastructure layer for handling service-to-service communication. The service mesh is responsible for the reliable delivery of requests through the complex topology of services that may comprise a modern, cloud native application. Further details concerning aspects of example service meshes are disclosed elsewhere herein.

At least some embodiments of the invention are directed to a data protection system with automated smart restore functionality for microservices of cloud native applications. Among other things, the data protection system may help a user build a smart restore policy to restore one or more microservices to a particular point in time. Since an application may comprise many different microservices, some services may be consistency related. That is, if one microservice is restored to a previous point in time, dependent or related microservices may need to be restored as well. On the other hand, some microservices are independent and if one service is broken, that microservice may be restored to a previous point in time, while other services are kept up to date. Embodiments of the invention include a smart backup and restore policy, and methods for creating those, which will know which services needs to be restored to a previous point in time when a service breaks.

Advantageously then, embodiments of the invention may provide various benefits and improvements relative to conventional hardware, systems and methods. To illustrate, embodiments of the invention may improve the operation of a computing system, or element of a computing system, by enabling the definition and use of automatic restore processes for microservices, which may be interdependent. As well, embodiments of the invention provide a degree of granularity in their application, such that only those microservices that need to be restored are touched by the restore process. This functionality may be particularly useful in cloud native microservice applications, as the relations between and among microservices may be extensive, and complex. Further, embodiments of the invention may advantageously employ service mesh connections in defining and implementing microservice restore processes. As well, by automatically implementing a granular restore process for microservices, embodiments of the invention improve the reliability of cloud native applications.

A. Aspects of Example Operating Environments

The following is a discussion of aspects of example operating environments for various embodiments of the invention. This discussion is not intended to limit the scope of the invention, or the applicability of the embodiments, in any way.

In general, example embodiments may be employed in connection with any computing environment in which one or more applications, and associated microservices, are deployed. Thus, while this disclosure refers to certain illustrative embodiments and associated computing environments, the scope of the invention is not limited to any particular type, configuration, or use, of computing environment.

Some particular example embodiments may be employed in connection with cloud computing environments, one example of which is a cloud data protection environment which can implement backup, archive, restore, and/or disaster recovery, functions. In at least some of these embodiments, the microservices may comprise elements of one or more different cloud native applications. Thus, as used herein, a 'cloud native application' embraces any application that comprises one or more microservices and is configured to operate in a cloud computing environment that may, or may not, take the form of a cloud data protection environment. The applications and microservices deployed in a cloud data protection environment, such as a cloud datacenter for example, may perform various functions. For example, one or more such applications and associated microservices may perform part, or all, of a backup process, a restore process, and/or any other service provided by, or otherwise associated with, a cloud storage environment.

In some alternative embodiments, a data protection environment may take the form of a remote cloud storage environment, an on-premises storage environment which may or may not be in the form of a cloud storage environment, and hybrid storage environments that include public and private elements, and/or that include local and remote elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

Any of the devices, including clients, servers, and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100, which may take the form of a cloud computing environment for example, may be associated with any number of cloud native applications, such as CNA1 102, CNA2 104, and CNAn 106, for example. The cloud native applications 102 . . . 106 may, or may not, be hosted by one or more host devices, one example of which is disclosed in FIG. 2, discussed below.

These cloud native applications 102 . . . 106 are not limited to the performance of any particular function(s). In some example embodiments, the operating environment 100 may be, or comprise, a cloud datacenter, and as such, the cloud native applications 102 . . . 106 may be involved in cloud datacenter operations such as backup and/or restore operations, for example. By virtue of their nature, the cloud native applications 102 . . . 106 may be able to rapidly scale their resource usage up and down according to demand. As well, embodiments of the cloud native applications 102 . . . 106 may be stateless, inasmuch as they are not tied to any particular infrastructure resources, whether hardware or software, in the operating environment 100.

With continued reference to FIG. 1, the operating environment 100 may include a restore module 150. In general, and as discussed in more detail elsewhere herein, the restore module 150 may, among other things, be operable to automatically generate a restore policy, as well as implement, or direct the implementation of, the restore policy to automatically identify and restore one or more microservices associated with one or more of the cloud native applications 102 . . . 106. As well, although not required, the restore module 150 may store microservice backups so that, in the event of the failure of a microservice, the backed up microservice can be restored by the restore module. The microservice backups may, more generally, be stored in any other location where they are accessible by the restore module 150.

In some embodiments, the restore module 150 may be hosted in a cloud computing environment, such as a cloud datacenter for example. However, this is not required and the restore module 150 may be hosted elsewhere.

Figure 2:
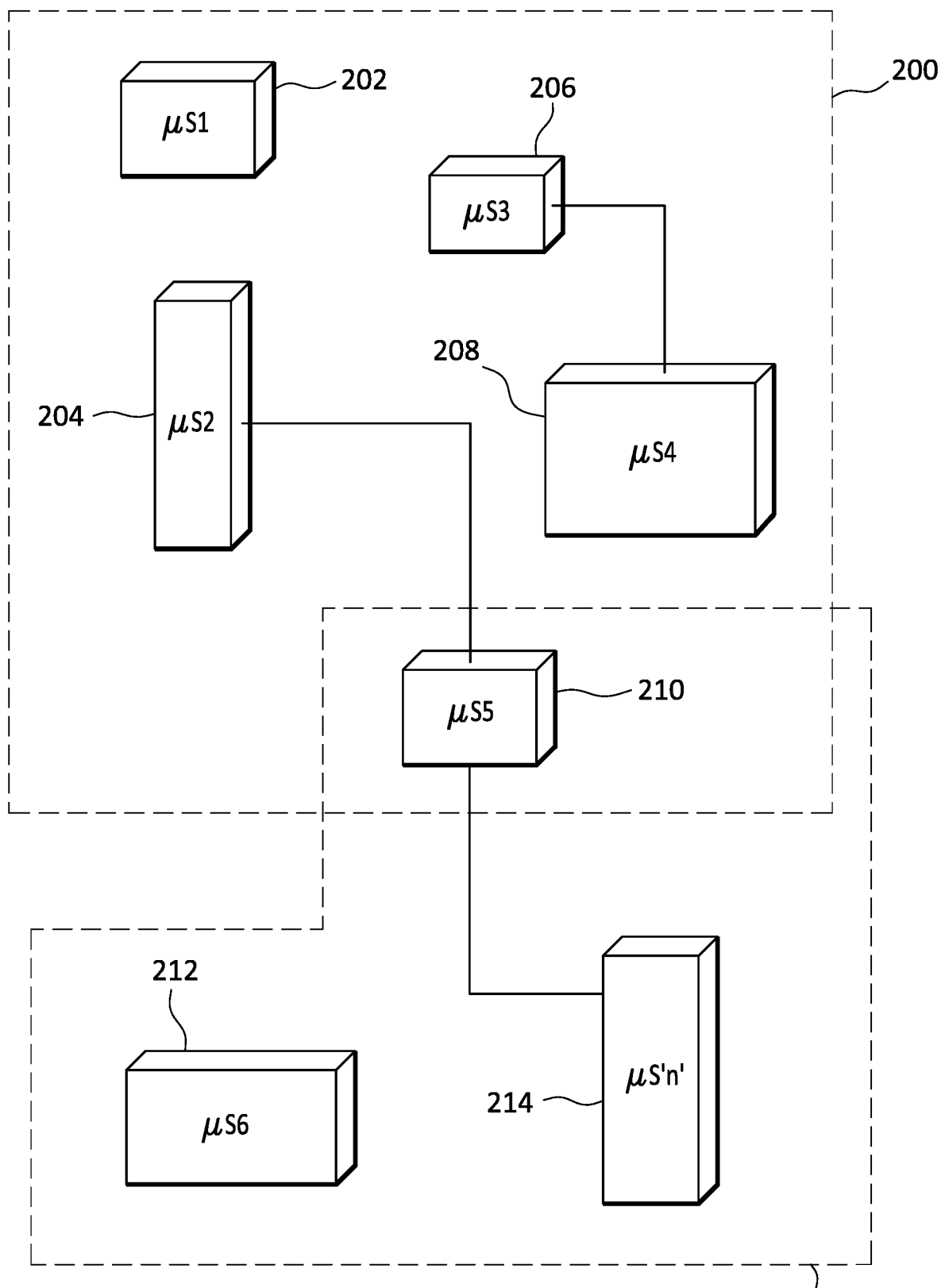
FIG. 2 discloses aspects of some example applications and associated microservices.

Turning now to FIG. 2, and with continued attention to FIG. 1, example cloud native applications 200 and 300 are disclosed. With reference first to cloud native application 200, this example embodiment comprises five different microservices, namely, $\mu s1$ 202, $\mu s2$ 204, $\mu s3$ 206, $\mu s4$ 208, and $\mu s5$ 210. Each of the microservices 202 . . . 210 may perform a different respective function, or functions. Where the operating environment 100 comprises a cloud computing system, such as a cloud datacenter for example, the functions performed by the microservices 202 . . . 210 may relate to processes such as data storage, data backup, and/or data restore. Additionally, or alternatively, the microservices 202 . . . 210 may perform other operations.

In the illustrated example, the nature of the cloud native application 200 is such that microservices 206 and 208 are interdependent, and microservices 204 and 210 are also interdependent. In contrast, microservice 202 is not dependent upon any other microservices. As used herein, interdependency embraces, at least, the notion that two or more microservices may be functionally related in some way and one of the microservices may not be able to correctly, or completely, operate unless the other associated microservice is also functioning properly. As another example, interdependency of microservices may also, or alternatively, embrace the notion that in order for one microservice to perform its operation(s), it is first necessary that another microservice have performed its respective operation(s). More generally, a lack of interdependency between two microservices reflects that these microservices can each operate fully and independently of the other, even if the other microservice were to fail.

With continued reference to FIG. 2, the example cloud native application 300 may comprise one or more microservices, such as μs6 212, μsn 214, and μs5 210. As such, the example microservice 210 is used both by cloud native application 300, and cloud native application 200. As well, microservice 214 is interdependent with microservice 210, while microservice 212 is independent of any other microservices.

B. Aspects of Example Service Meshes

As used herein, a service mesh refers to a dedicated infrastructure layer for handling service-to-service communication, that is, communications between/among microservices. The service mesh is responsible for the reliable delivery of requests through the complex topology of services that comprise a cloud native application. An example of a service mesh that may be employed in connection with embodiments of the invention is the service mesh technology provided by Istio (https://istio.io/).

The term service mesh is sometimes used to describe the network of microservices that make up cloud native applications, and the interactions between those cloud native applications. As a service mesh grows in size and complexity, it can become harder to understand and manage. Service mesh requirements can include discovery, load balancing, failure recovery, metrics, and monitoring, and often more complex operational requirements such as A/B testing, canary releases, rate limiting, access control, and end-to-end authentication.

In some circumstances, a service mesh platform may provide a suitable solution to satisfy the diverse requirements of microservice applications by providing behavioral insights and operational control over the service mesh as a whole. For example, the Istio platform and/or other service meshes may provide a number of useful capabilities uniformly across a network of microservices.

One such capability concerns traffic management. A service mesh may operate to control the flow of traffic and application program interface (API) calls between services, make calls more reliable, and make the network more robust in the face of adverse conditions. Another such capability is observability. That is, a service mesh may be used to help gain an understanding of the dependencies between services and the nature and flow of traffic between the services, thus providing the ability to quickly identify issues. A further capability is policy enforcement. Thus, a service mesh may apply organizational policy to the interaction between services, and ensure that access policies are enforced and resources are fairly distributed among consumers. Policy changes may be made by configuring the mesh, not by changing application code. Yet another capability of some service mesh implementations is service identity and security. That is, services associated with the service mesh are provided with a verifiable identity and provide the ability to protect service traffic as it flows over networks of varying degrees of tractability.

In addition to the aforementioned capabilities, a service mesh may be designed for extensibility to meet diverse deployment needs. For example, the service mesh may operate with a variety of different environments and platforms, such as environments that span Cloud, on-premise, Kubernetes, and Mesos for example. Embodiments of the invention may be employed in connection with any of these environments. As well, a service mesh may provide for integration and customization. That is, a policy enforcement component can be extended and customized to integrate with existing solutions for access control lists (ACL), logging, monitoring, quotas, auditing and more.

Service mesh capabilities such as the examples noted may greatly decrease the coupling between application code, the underlying platform, and policy. This decreased coupling not only makes services easier to implement, but also makes it simpler for operators to move application deployments between environments or to new policy schemes. Applications may become inherently more portable as a result.

C. Example Host and Server Configurations

Figure 3:
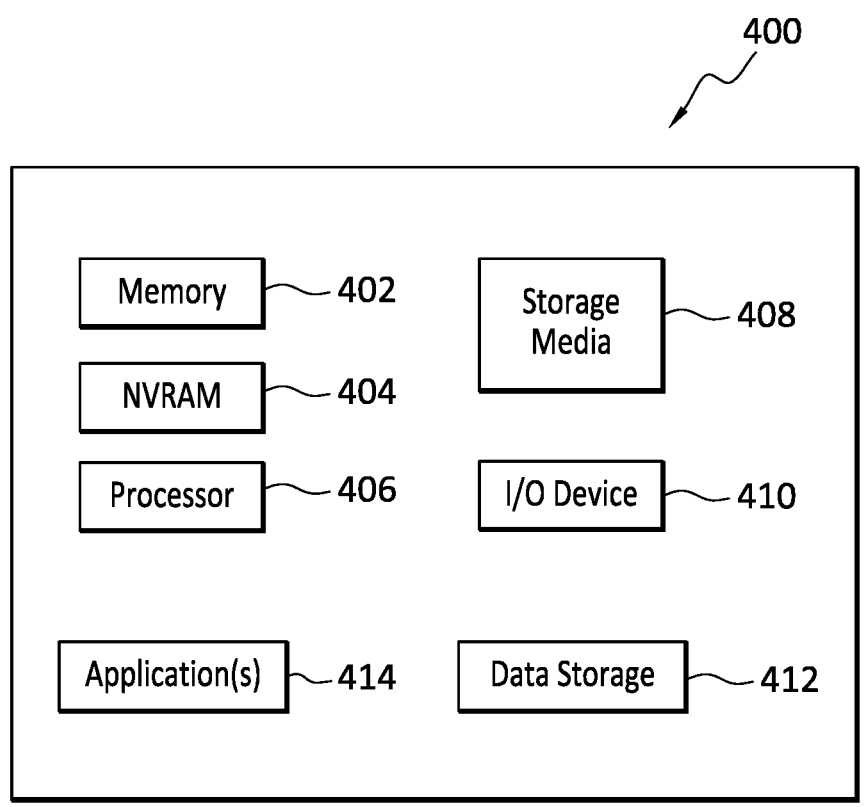
FIG. 3 discloses aspects of an example host configuration.

With reference briefly now to FIG. 3, any one or more of the operating environment 100, cloud native applications 102 . . . 106, 200, 300, restore module 150, and microservices 202 . . . 214 can take the form of, include, and/or be hosted by, a physical computing device, one example of which is denoted at 400. As well, where any of the aforementioned elements comprise or consist of a virtual machine (VM), that VM may constitute a virtualization of any combination of the physical components disclosed in FIG. 3.

In the example of FIG. 3, the physical computing device 400 includes a memory 402 which may comprise one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components 402 of the physical computing device can take the form of solid state device (SSD) storage. As well, one or more applications 414 are provided that comprise executable instructions. Such executable instructions can take various forms including, for example, instructions executable to perform any method or portion thereof disclosed herein. Such instructions may be executable by/at any of a cloud computing site, cloud datacenter, client, restore module, backup server, restore server, or any other entity, to perform one or more functions of one or more microservices alone or in cooperation with one or more other microservices, functions of a cloud native application, and functions of a restore module as disclosed herein. As well, such instructions may be executable to perform read, write, backup, and restore operations.

D. Example Microservice Restore Policies and Processes

Figure 4:
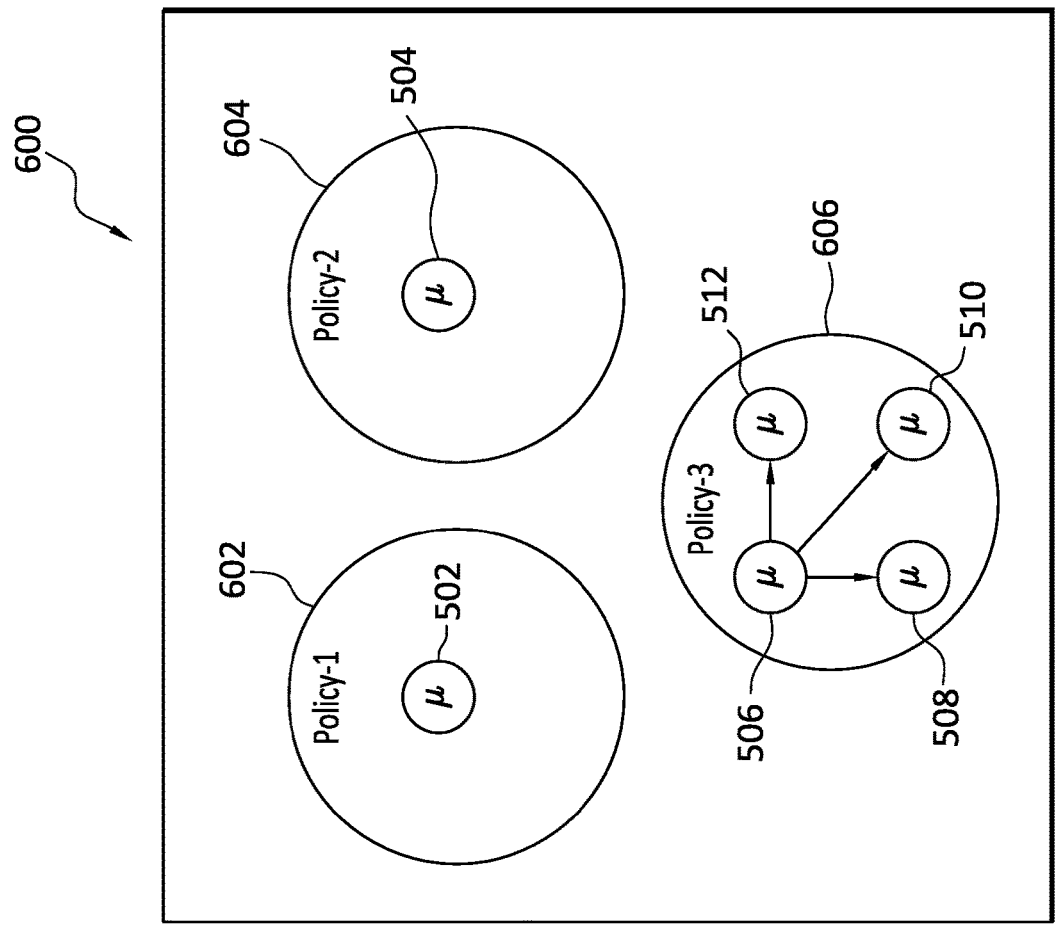
FIG. 4 discloses aspects of some example application restore policies and microservice restore policies.
Figure 4:
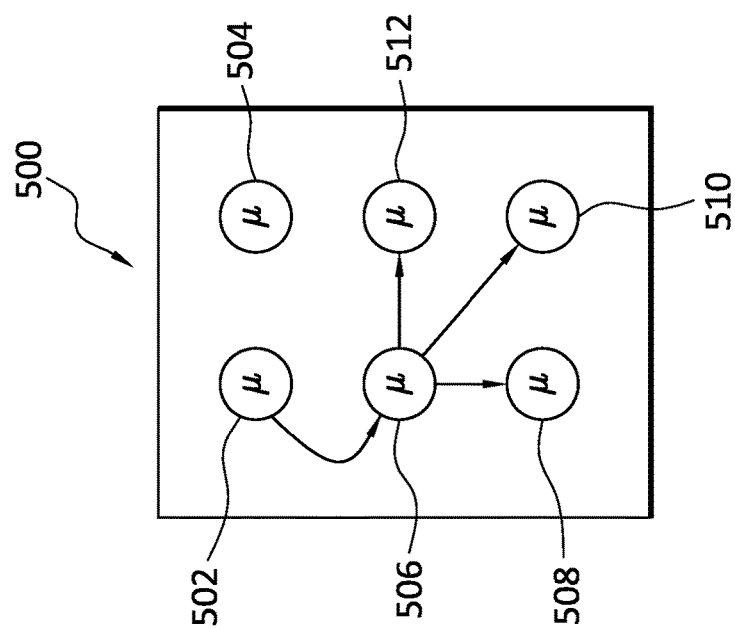

With reference now to FIG. 4, details are provided concerning systems, structures and processes which enable automated smart restores of microservices. Such structures and processes may be especially well suited for integration with cloud native environments, and include creation of dependency graphs between microservices which will aid the user in building a smart restore policy for the microservices. Some functionalities and capabilities of various example embodiments are set forth in the following discussion.

For example, in at least some embodiments, a system and method for generating a restore policy may create a dependency graph between microservices, where a connection between, or among, microservices indicates that those microservices must be backed up and restored from the same point in time. As well, example embodiments of the system and method may enable a user to verify and build the connection graph between the different microservices that make up the cloud native application.

Example embodiments may also employ automatic discovery of a failure source based on previous failures of microservices and then, based on the service mesh connection, may create a hint graph or other information indicating to the user what the connections between microservices may be. This functionality may enable the system and/or user to more quickly identify the source of a microservice problem. As well, embodiments of the invention may simulate failures and replay traces to determine whether restoring only the failed service would allow the system to work without flaw.

Finally, example embodiments may restore one or more microservices based on their required performance and/or relationships with other microservices. For example, data services which need high performance and high storage bandwidth may be restored first, and then any remaining services restored. Services may additionally, or alternatively, be restored based on their interdependency with one or more other services, or may be restored based on their lack of interdependency. For example, since independent services are not connected to other services, the independent services may be relatively easier to restore than a service that is interdependent on one or more other services. On the other hand, interdependent services may have far reaching and complex effects, due to their independent nature, and as such, it may be desirable in some cases to restore interdependent services before restoring independent services.

Turning now to FIG. 4, an example application 500, which may be a cloud native application, is indicated, and an associated example application restore policy 600 is indicated as well. In this illustrative example, the application 500 includes microservices 502, 504, 506, 508, 510 and 512. As indicated by the connection between the microservice 502 and the microservice 506, the microservice 502 may be related in some way, but is not interdependent with, the microservice 506. By way of contrast, the microservice 504 has no relation or interdependency with any of the other microservices of the application 500. That is, the microservice 504 is independent of the other microservices and, as such, the microservice 504 can be restored on its own and without reference to the other microservices.

In contrast with microservice 504, the microservice 506 is interdependent with microservices 508, 510 and 512. As such, if a problem occurs with any of those microservices 508, 510 or 512, such that restoration is required, all of microservices 506 ... 512 must be restored together. This is true, even though microservices 508, 510 and 512 are not directly dependent on each other, because microservices 508, 510 and 512 are indirectly related to each other by way of the microservice 506. Thus, for the purposes of defining and implementing a restoration policy, the microservices 506 ... 512 may all be considered together.

In at least some embodiments, relationships such as dependencies between microservices, are defined at the time the application, such as the application 500 for example, is created. Where such dependencies change however, those changes can be communicated to a restore module, for example, and the restore policies that reflect those dependencies may be automatically updated by the restore module.

With continued reference to FIG. 4, the example application restore policy 600 reflects, and takes into account, the relationships, or lack thereof, between/among the example group of microservices 502 ... 512 that comprise the application 500, or at least a portion of the application 500. In the illustrated example, the application restore policy 600 includes three components, or individual restore policies, 602, 604 and 606, each of which applies to one or more of the microservices 502 ... 512.

Due to the granularity of embodiments of a restore policy such as the application restore policy 600 for example, that is, the fact that the application restore policy 600 comprises multiple individual restore policies, some of which may target as few as only a single microservice, restore procedures can be directed to one or more specific microservices, rather than to the application 500 as a whole. That is, only services that actually need to be restored are restored, while microservices that are running normally are not affected by the restore procedures. This may be particularly beneficial where, for example, a microservice is an element of multiple different applications. Among other things, this granular approach to microservice restoration may help to minimize disruption to the associated application(s) and processes, as well as to related microservices and applications.

With reference first to the restore policy 602, it can be seen that the policy 602 reflects that microservice 502 and microservice 506 are related in some way, but neither of those microservices is dependent upon the other. Thus, implementation of the policy 602 may involve restoration of only microservice 502, or only microservice 506, or both microservice 502 and microservice 506.

As indicated by restore policy 604, the microservice 504 may be restored without reference to, or restoration of, any other microservices. This is due to the fact that microservice 504 is not dependent upon any other microservices and can thus be restored by itself should a problem occur that necessitates such restoration. Thus, restoration of the microservice 504 can be effected without disruption to any other microservices, or to the application 500.

With continued reference to the application restore policy 600, a further restore policy 606 is included as part of the application restore policy 600. The restore policy 606 accounts for the relationships between/among, and thus embraces, the microservices 506, 508, 510 and 512. As indicated, the microservice 506 is dependent upon each of microservices 508, 510 and 512. As such, if any of the microservices upon which microservice 506 depends were to experience a problem or failure, such as microservice 510 for example, the microservice 506 would be rendered inoperable. Thus, both the microservice 506 and microservice 510 would have to be restored. This same general approach may be applied to a failure or problem with microservice 508 and/or microservice 510. If only the microservice 506 fails, then the microservices 508, 510 and 512 need not be restored.

In any case, and as the foregoing examples illustrate, the application restore policy 600, and its constituent microservice restore policies 602, 604 and 606, enable a focused, or granular, approach to restoration in which only the microservices that fail, and/or dependent microservices, are targeted for restoration. To the extent practicable, example embodiments of the invention do not touch microservices that are functioning properly.

It will be appreciated that the various policies disclosed in FIG. 4 are presented only by way of example and are not intended to limit the scope of the invention in any way. Various other policies and relationships are possible, and contemplated as being within the scope of the invention. By way of illustration only, and returning briefly to FIG. 2 as well, it is possible that multiple different microservices may have a dependent relationship with another microservice, as shown for example, by microservice 204 and 214, both of which depend on microservice 210. These example configurations and relationships may be reflected in one or more appropriate application restore policies and/or one or more microservice restore policies.

E. Aspects of Example Methods Concerning Restore Policies

Figure 5:
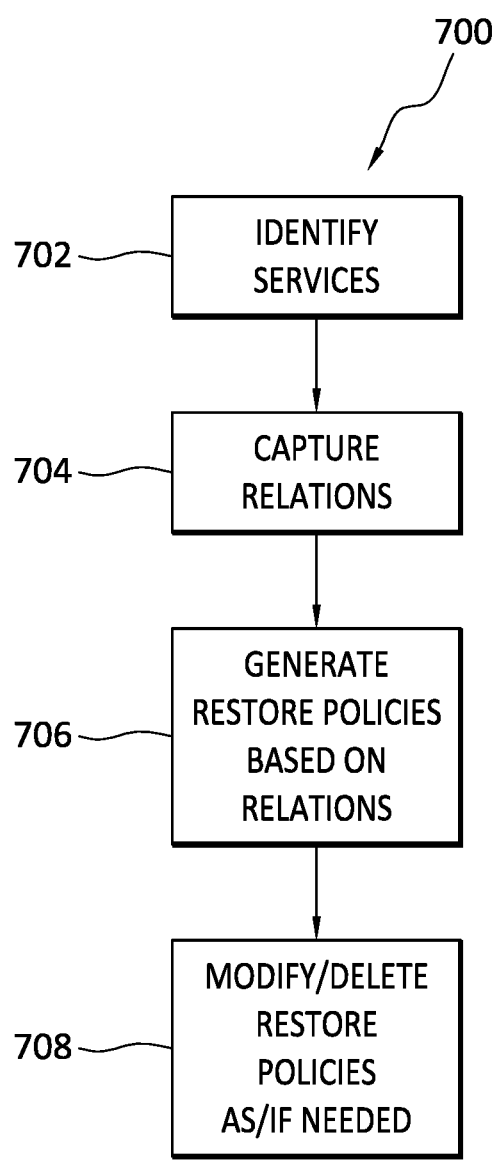
FIG. 5 is a flow diagram directed to an example method for creating application restore policies and microservice restore policies.

With attention now to FIG. 5, details are provided for some example methods for creation and implementation of a microservice restore policy, where one example embodiment of such a method is denoted generally at 700. One, some, or all, of the processes disclosed in method 700 may be performed in whole or in part by a restore module, such as the example restore module 150. This is not required however, and part or all of the method 700 may additionally, or alternatively, be performed by one or more other entities. Such entities, and the restore module 150, may, or may not be elements of a cloud computing system, such as a cloud datacenter for example.

Initially, the method 700 may begin when the various microservices that make up an application are identified 702. This identification may take place before, during, or after, creation of the applications. In some embodiments, the application is executable to perform data protection functions such as backup and/or restore functions. These functions may be performed in a cloud computing environment, but that is not necessarily required.

In connection with identification of the microservices 702, information concerning the relations, if any, between/among the various microservices that make up the application may be captured 704. The captured information 704 may also include information indicating that one or more of the microservices identified at 702 is also an element of one or more other applications as well.

When the various microservices have been identified 702, and relations between/among the microservices captured 704, an application restore policy, which may comprise, or consist of, one or more microservice restore policies, may be generated 706. The generation 706 of an application restore policy and associated microservice restore policies may include incorporating a requirement that dependent microservices will be backed up and restored from a common point in time.

Some examples of application restore policies, and associated microservice restore policies, are discussed above in connection with FIG. 4. The application restore policies and microservice restore policies may be stored, such as in a library at a restore module for example, and/or at any other suitable site. These policies may also be tagged or otherwise identified as corresponding to the related application(s) and associated microservice(s) so that in the event of a problem with an application, the appropriate policies can be retrieved and acted upon.

As further indicated in FIG. 5, there may be times when it becomes necessary to modify, or delete, a restore policy. For example, if new dependencies are defined and implemented between/among microservices of an application, an existing restore policy may be modified 708 to reflect those changes. Alternatively, the existing restore policy may be deleted 708, and a new policy created 706.

Figure 6:
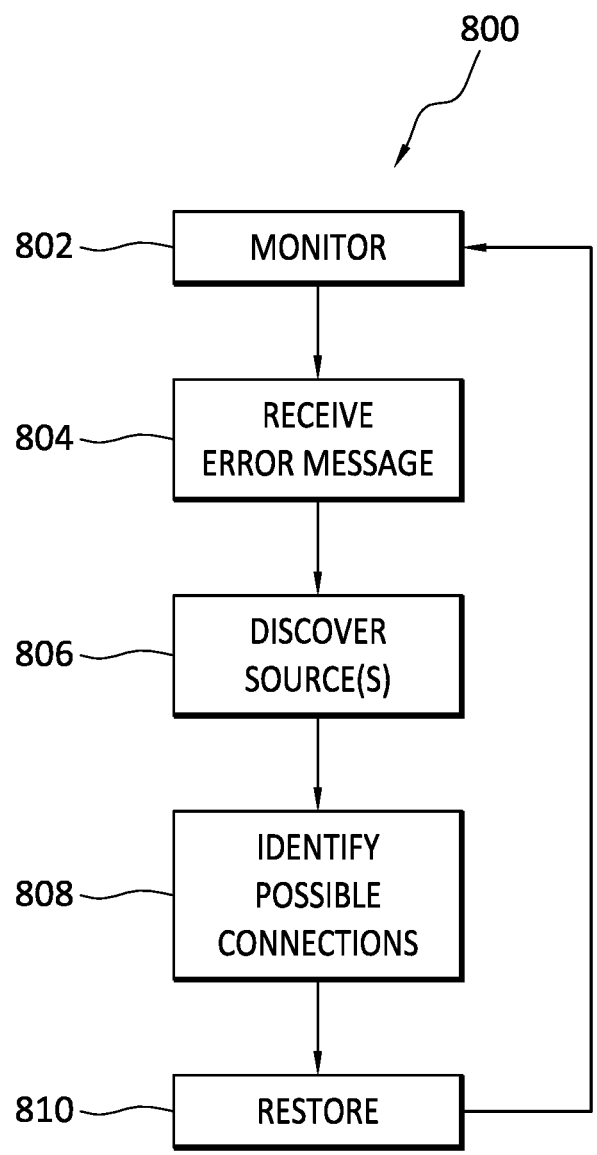
FIG. 6 is a flow diagram directed to an example method for automatically restoring a microservice that has experienced a problem.

Turning now to FIG. 6, details are provided concerning methods for performing an automated restore of one or more microservices, one example of which is denoted generally at 800. The method 800 may begin at 802 where a monitoring process is performed that listens for, or otherwise identifies, problems with one or more applications that include one or more respective microservices.

At some point, the system which may comprise, or consist of, a restore module, may receive an error message 804, or otherwise become aware of a problem, concerning the application. Accordingly, the next stage in the method 800 is to discover the source, or sources, of the problem 806. This may be done in a variety of ways. In some embodiments, the system may be able to discover 806, automatically in at least some embodiments, the problem by using information beyond simply the problem itself such as, for example, information concerning previous failures of service relating to the application in question. Based on this information, and/or based on service mesh connections between microservices and other service mesh information, one or more possible connections may be identified 808. These potential connections may be presented to a user, such as in the form of a hint graph, that advises the user of at least an initial assessment of the system as to microservice connections that may possibly be the source(s) of the problems.

As part of 806 or 808, or separately, the system may simulate microservice failures, and replay traces, in an attempt to determine the identity of the failed microservice, and/or to determine if restoring the suspect microservice is sufficient to enable the application to operate correctly. If these efforts succeed, or fail, further inferences can be drawn. For example, if the simulation indicates that the application works properly after simulated restoration of the microservice, then it can be inferred that such microservice is a likely source of the problem and should accordingly be restored.

After the source(s) of the problem have been identified, the applicable application restore policy and microservice restore policies can be implemented, and the microservice(s) that caused the problem restored 810. As noted elsewhere herein, example embodiments may restore one or more microservices based on their required performance, relationships with other microservices, and/or any other bases including system and operating environment constraints. For example, data services which need high performance and high storage bandwidth may be restored first, and then any remaining services restored. After restoration 810 of the microservice, and/or at any other time during performance of the method 800, monitoring 802 may resume/continue.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon.

Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving an indication that an application has experienced a problem, where the application comprises a plurality of microservices;
   discovering that one of the microservices is a partial cause of the problem;
   identifying one or more connections among the microservices, where one or more of the connections indicates a dependency, or lack of dependency, among two or more microservices; and
   restoring, together, both the microservice that is a partial cause of the problem and any other microservices that are dependent on that microservice.

2. The method as recited in claim 1, wherein identifying one or more connections comprises consulting microservice dependency information that was created prior to occurrence of the problem, and the microservice dependency information discloses the one or more connections.

3. The method as recited in claim 1, wherein one of the microservices comprises an element of another application.

4. The method as recited in claim 1, wherein identifying one or more connections among the microservices comprises evaluating a service mesh that includes connection information.

5. The method as recited in claim 1, wherein at least part of the method is performed automatically without human instruction or human intervention.

6. The method as recited in claim 1, wherein the restoration process is performed automatically as a result of receipt of the indication that a problem has occurred.

7. The method as recited in claim 1, wherein the method is performed in a cloud computing environment.

8. The method as recited in claim 1, wherein the restoring is performed according to a policy that was created based on dependency information that discloses the connections among the microservices.

9. The method as recited in claim 8, further comprising automatically updating the policy in response to a change in a relation between microservices.

10. The method as recited in claim 1, wherein the restored microservice is restored based in part on required performance of that microservice.

11. A non-transitory storage medium having stored therein computer-executable instructions which, when executed by one or more hardware processors, perform the following operations:
    receiving an indication that an application has experienced a problem, where the application comprises a plurality of microservices;
    discovering that one of the microservices is a partial cause of the problem;
    identifying one or more connections among the microservices, where one or more of the connections indicates a dependency, or lack of dependency, among two or more microservices; and
    restoring, together, both the microservice that is a partial cause of the problem and any other microservices that are dependent on that microservice.

12. The non-transitory storage medium as recited in claim 11, wherein identifying one or more connections comprises consulting microservice dependency information that was created prior to occurrence of the problem, and the microservice dependency information discloses the one or more connections.

13. The non-transitory storage medium as recited in claim 11, wherein one of the microservices comprises an element of another application.

14. The non-transitory storage medium as recited in claim 11, wherein identifying one or more connections among the microservices comprises evaluating a service mesh that includes connection information.

15. The non-transitory storage medium as recited in claim 11, wherein the restoring is performed according to a policy that was created based on dependency information that discloses the connections among the microservices.

16. The non-transitory storage medium as recited in claim 15, further comprising automatically updating the policy in response to a change in a relation between microservices.

17. The non-transitory storage medium as recited in claim 11, wherein the restoration process is performed automatically as a result of receipt of the indication that a problem has occurred.

18. The non-transitory storage medium as recited in claim 11, wherein the restoring is performed according to a policy that was created based on dependency information that discloses the connections among the microservices.

19. The non-transitory storage medium as recited in claim 18, further comprising automatically updating the policy in response to a change in a relation between microservices.

20. The non-transitory storage medium as recited in claim 11, wherein the restored microservice is restored based in part on required performance of that microservice.

* * * * *